US012595841B2

(12) United States Patent
Maier

(10) Patent No.: US 12,595,841 B2
(45) Date of Patent: Apr. 7, 2026

(54) BREATHER WITH PRESSURE-EQUALIZATION FUNCTION

(71) Applicant: Bayerische Motoren Werke Aktiengesellschaft, Munich (DE)

(72) Inventor: Bernhard Maier, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 227 days.

(21) Appl. No.: 18/697,524

(22) PCT Filed: Oct. 6, 2022

(86) PCT No.: PCT/EP2022/077815
§ 371 (c)(1),
(2) Date: Apr. 1, 2024

(87) PCT Pub. No.: WO2023/078630
PCT Pub. Date: May 11, 2023

(65) Prior Publication Data

US 2024/0410462 A1 Dec. 12, 2024

(30) Foreign Application Priority Data

Nov. 8, 2021 (DE) ...................... 10 2021 128 981.5

(51) Int. Cl.
*F16H 57/027* (2012.01)
*F16H 57/02* (2012.01)
(Continued)

(52) U.S. Cl.
CPC ............. *F16H 57/027* (2013.01); *H02K 5/10* (2013.01); *H02K 7/116* (2013.01); *F16H 2057/02034* (2013.01); *H02K 2205/09* (2013.01)

(58) Field of Classification Search
CPC ......... F16H 57/027; F16H 2057/02034; F16H 2200/0021; H02K 5/10; H02K 7/116; H02K 2205/09
See application file for complete search history.

(56) References Cited

U.S. PATENT DOCUMENTS 5,129,422 A * 7/1992 Davison, Jr. .......... F16H 57/027
33/727
6,039,070 A * 3/2000 Zaehe ................... F16K 17/105
137/491
(Continued)

FOREIGN PATENT DOCUMENTS

DE 10 2008 052 548 A1 5/2010
DE 10 2018 125 460 A1 4/2020
(Continued)

OTHER PUBLICATIONS

International Search Report (PCT/ISA/210) issued in PCT Application No. PCT/EP2022/077815 dated Jan. 23, 2023 with English translation (5 pages).
(Continued)

*Primary Examiner* — Tulsidas C Patel
*Assistant Examiner* — Mohammed Ahmed Qureshi
(74) *Attorney, Agent, or Firm* — Crowell & Moring LLP

(57) ABSTRACT

A breather device with a pressure-equalization function having a breather connection and an environment connection is provided between an electric machine compartment and a transmission compartment. One of the two connections is fluidically connected to an environment surrounding the breather device and the respective other connection can be fluidically connected to the transmission compartment. The breather device has a breather valve, with which a fluid-conducting connection between the breather connection and the environment connection can be selectively interrupted by a breather valve body. The breather valve has
(Continued)

a valve preloading device with a valve preloading element, wherein the valve preloading element separates a preloading pressure compartment into a first preloading sub-compartment and a second preloading sub-compartment and wherein a preloading force on the breather valve body can be directly or indirectly altered using the valve preloading element. The first preloading sub-compartment can be fluidically connected via a first pretension connection to the transmission compartment or the electric machine compartment. The second preloading sub-compartment can be fluidically connected to a second preloading connection by the other of these two compartments.

11 Claims, 2 Drawing Sheets

(51) Int. Cl.
H02K 5/10 (2006.01)
H02K 7/116 (2006.01)

(56) References Cited

U.S. PATENT DOCUMENTS

| | | | |
|---|---|---|---|
| 6,719,096 B2 * | 4/2004 | Mogi ................... | F16H 57/027 74/606 R |
| 2008/0099258 A1 | 5/2008 | Berhan | |
| 2021/0095752 A1 | 4/2021 | Hensel et al. | |

FOREIGN PATENT DOCUMENTS

| | | |
|---|---|---|
| DE | 20 2019 103 778 U1 | 10/2020 |
| DE | 10 2019 126 269 A1 | 4/2021 |
| EP | 2 332 760 A1 | 6/2011 |
| JP | 2004-350458 A | 12/2004 |
| WO | WO 2021/079664 A1 | 4/2021 |

OTHER PUBLICATIONS

German-language Written Opinion (PCT/ISA/237) issued in PCT Application No. PCT/EP2022/077815 dated Jan. 23, 2023 with English translation (9 pages).
German-language Search Report issued in German Application No. 10 2021 128 981.5 dated Sep. 5, 2022 with partial English translation (10 pages).
German-language Office Action issued in German Application No. 10 2021 128 981.5 dated Jul. 25, 2023 (3 pages).
International Standard, "Road vehicles—Degrees of Protection (IP code)—Protection of Electrical Equipment Against Foreign Objects, Water and Access", ISO (International Organization for Standardization), Second Edition, ISO 20653:2013(E) Feb. 15, 2013, pp. 1-23 (29 Pages).

* cited by examiner

BREATHER WITH PRESSURE-EQUALIZATION FUNCTION

BACKGROUND AND SUMMARY

The invention relates to a breather device with pressure-equalization function.

DE 20 2019 103 778 U1 relates to a transmission, in particular a locked single-gear transmission with venting and a reduced risk of oil escaping.

The invention is described below on the basis of an integrated drive unit for a motor vehicle; this is not to be understood as a restriction of the invention to this application, but rather as a possible use of the invention. It is generally known from the prior art that, in transmissions, the media contained in the transmission chamber, in particular the air and the lubricating oil, can expand during operation. An integrated drive unit has an electric drive machine and what is known as a traction transmission, which is designed to transmit the drive power provided by the electric drive machine. Furthermore, a drive unit of this kind has an electric drive machine, that is to say an electric motor/generator. This electric drive machine is of dry-running design, that is to say it has at least one sub-chamber which is free of lubricating oil, and insofar as this sub-chamber has components that transmit electrical power, ingress, in particular of lubricating oil, into this sub-chamber is to be prevented. The mechanical power transmission (rotation speed, torque) from the electric drive machine to the traction transmission takes place in a small installation space in the case of an integrated drive machine and transfer of liquid from the traction transmission to the electric drive machine has to be reliably prevented, and this can be easily achieved by way of a drive shaft seal with a corresponding sealing action being provided for sealing off the passage of the drive shaft out of the electric drive machine into the traction transmission. A seal of this kind is then also generally insensitive to pressure differences between the traction transmission and the electric machine, but furthermore a seal of this kind can offer potential for friction optimization.

Against this background, an object of the invention is to provide venting which allows better pressure equalization between two chambers, this object being achieved by a breather device, by a breather system, and also by an electric drive unit, according to the independent claims. Preferred developments of the invention are the subject matter of the dependent patent claims.

For the purposes of the invention, a breather device with pressure-equalization function between an electric machine chamber and a transmission chamber is to be understood to mean a device by means of which a pressure difference between a transmission chamber, which is in particular fluidically separated from an electric machine chamber, and this electric machine chamber can be limited. This breather device preferably allows medium to flow from the transmission chamber to the environment surrounding the breather device in the event of an increase in pressure in this transmission chamber in relation to the electric machine chamber. However, furthermore, uncontrolled inflow of medium, in particular ambient air, from the environment surrounding the breather apparatus to the transmission chamber can also be prevented using this breather device.

The breather device has what is known as a venting connection, which can be connected in a fluid-conducting manner to the transmission chamber. A line is preferably provided for this fluid-conducting connection, this line preferably being designed at least in sections as a pipeline, preferably as a hose line and particularly preferably as a housing duct line. The breather device further has a surroundings connection. The breather device is connected in a fluid-conducting manner or can be connected to the environment surrounding the breather device by means of this surroundings connection, and further preferably a fluid-conducting connection can selectively be established or interrupted by means of this breather device between this venting connection and the surroundings connection. In functional terms, when a fluid-conducting connection is established between the surroundings connection and the venting connection, pressure equalization between a volume connected in a fluid-conducting manner to the venting connection and the environment connected to the surroundings connection and surrounding the breather device is possible and, when the fluid-conducting connection between the surroundings connection and the venting connection is interrupted, passage of medium from this environment to this volume, in particular to the transmission chamber, is prevented.

In particular, for providing this selective fluid-conducting connection, the breather device has a venting valve, by way of which this fluid-conducting connection between the venting connection and the surroundings connection can be selectively interrupted by means of a venting valve body; figuratively speaking, the venting valve is arranged in the flow path, which forms the fluid-conducting connection, between the venting connection and the surroundings connection. The venting valve is further preferably designed as a kind of non-return valve which suppresses a fluid-conducting connection in the flow direction from the surroundings connection to the venting connection owing to its non-return functionality and which opens a fluid-conducting connection from the venting connection to the surroundings connection, in particular at least temporarily, when there is a pressure difference, in particular specified by the design of the breather device, between the venting connection and the surroundings connection, wherein this pressure difference can be changed by further parameters.

In order to provide a fluid-conducting connection between the venting connection and the surroundings connection that can be selectively interrupted, the breather device therefore has this venting valve, which has a valve preloading device with a valve preloading element. In particular, this valve preloading element is designed by the valve preloading device to influence the pressure difference between the pressures applied to the surroundings connection and to the venting connection, that is to say in particular the pressure difference starting from which the venting valve establishes the fluid-conducting connection between these two connections (surroundings connection and venting connection). In particular, for providing this pressure difference which can be influenced, the valve preloading device has a preloading pressure chamber which is separated into a first preloading sub-chamber and a second preloading sub-chamber by means of a valve preloading element which can preferably be moved in the preloading pressure chamber. In particular, an action of force is impressed onto the valve preloading element by means of different pressures in the first preloading sub-chamber and in the second preloading sub-chamber, in particular the valve preloading element is pushed away in the direction of the preloading sub-chamber, or a corresponding action of force is impressed onto the valve preloading element in the direction of the preloading sub-chamber to which a lower pressure is applied than the other preloading sub-chamber, so that a valve preloading force is indirectly or directly applied to the venting valve body by way of the valve preloading element.

Furthermore, the valve preloading element is mechanically indirectly or directly coupled to the venting valve body. Within the meaning of this invention, direct coupling is in particular to be understood to mean that this valve preloading element is coupled elastically, preferably by means of a spring device, to this venting valve body for transmitting the preloading force. Within the meaning of this invention, indirect coupling is to be understood to mean that this valve preloading element is preferably coupled by means of a lever device or preferably another device for converting, in particular increasing or reducing, the preloading force to the venting valve body. It is further preferably possible to structurally adjust the control behavior of the breather device or the breather system by means of the ratio of the size of the areas on which the corresponding pressures act.

In other words, the preloading force acting on the venting valve body can be influenced by means of these two preloading sub-chambers and via the valve preloading element which movably separates them and thus the characteristic of the venting valve, that is to say in particular the pressure difference at which this separates or opens the fluid-conducting connection between the surroundings connection and the venting connection, and therefore an improved breather device can be presented. However, in the case of known venting devices, the ventilation/venting depends solely on the pressure gradient of the housing chamber which is to be ventilated or vented and the environment surrounding the housing chamber, but in the case of the invention a further housing chamber and its pressure are included in the control by means of the valve preloading device, and an improved functionality is achieved in this way.

Furthermore, this first preloading sub-chamber can be connected in a fluid-conducting manner via a first preloading connection in particular to the transmission chamber, or another housing interior which has, in particular, a positive pressure in relation to a surrounding area or another housing interior, preferably adjoining the first-mentioned housing interior. Furthermore, this second preloading sub-chamber can be connected in a fluid-conducting manner via a second preloading connection in particular to an electric machine chamber or to another housing interior which has a negative pressure in relation to a surrounding area or another housing interior, preferably adjoining the first-mentioned housing interior.

The basic idea of the invention is thus that the venting characteristic of the breather device does not depend only on a pressure difference between the housing interior to be vented, that is to say in particular the transmission chamber, and an environment surrounding the housing interior, but rather additionally also depends on a pressure difference between the housing interior to be vented and a further housing interior, preferably adjoining the housing interior, or can be influenced by the pressure difference and in particular the valve preloading device is provided for performing this influencing, the valve preloading device being operatively connected to the venting valve in the manner outlined above.

A valve preloading element preferably preloads a valve body into a closed position. This valve preloading element is preferably arranged in the preloading pressure chamber and divides the preloading pressure chamber at least in portions or entirely into two preloading sub-chambers to which different pressures can be applied and further preferably this valve preloading element is arranged movably in this preloading pressure chamber. A pressure difference in these two preloading sub-chambers preferably leads to an action of force on this valve preloading element, in particular depending on the areas of the valve preloading element on which these pressures act.

In a likewise preferred embodiment, this first preloading sub-chamber can be connected in a fluid-conducting manner in particular to the electric machine chamber via the first preloading connection and further preferably the second preloading sub-chamber can be connected in a fluid-conducting manner in particular to the transmission chamber via the second preloading connection. In this embodiment, the venting connection is preferably connected in a fluid-conducting manner to an environment surrounding the venting device and further preferably the surroundings connection can then be connected in a fluid-conducting manner to a housing interior to be ventilated, preferably to the transmission chamber. In particular, ventilation of a housing interior from the environment surrounding the venting device can be achieved with a venting device of the type described. In this embodiment, the venting valve is further preferably designed as a kind of non-return valve and this non-return valve is further preferably then shut off to provide blocking in the direction from the housing interior to be ventilated to the environment surrounding the breather device. The closing force of this breather valve is further preferably determined by means of the valve preloading device and preferably the pressures applied there (first preloading sub-chamber/second preloading sub-chamber) and the structurally specified areas of the valve preloading element.

In a preferred embodiment of the breather device, the valve preloading element is mechanically coupled to the venting valve body by means of a spring device and in this embodiment the preloading force is further preferably transmitted from the valve preloading element to the venting valve body or applied to the venting valve body by means of this spring device. In functional terms, the venting valve opens the fluid-conducting connection from the venting connection toward the surroundings connection against this preloading force, so that the venting valve opens when there is a relatively small pressure difference between the pressure applied to the venting connection and the pressure applied to the surroundings connection, provided that the preloading force applied by the valve preloading element is reduced compared to when the preloading force applied by the valve preloading element is normal or increased. Experiments have shown that individual operating points can occur, which appear to make such a control behavior of the breather device preferable. In particular in connection with an integrated electric drive unit of the design explained at the outset, the use of a more efficient seal between two adjacent housing interiors is rendered possible with the proposed breather device, in particular when a drive shaft is passed through this seal and thus an increase in efficiency can be achieved by means of the improved control behavior of the breather device.

In a preferred embodiment, the valve preloading element applies the preloading force to the venting valve body, it being possible for this preloading force to also be referred to as a closing force, indirectly or directly in such a way that the venting valve body is preloaded into a closure position by the preloading force, the fluid-conducting connection between the venting connection and the surroundings connection being interrupted in the closure position. Furthermore, when this preloading force is increased, in particular by means of the valve preloading device, an increase in the force which is to be applied in order to push the venting valve body into a partially or completely opened position is required, so that a fluid-conducting connection is established between the venting connection and the surroundings connection. Further preferably, the venting valve can be understood to be a normally closed valve in this sense. Using a normally closed valve of this kind, it is possible for the fluid-conducting connection between the venting connection and the surroundings connection to be established only when an at least specifiable pressure difference between the pressures applied to these connections prevails, so that inflow of medium from the surrounding area into the venting connection via the surroundings connection is prevented.

Furthermore, in particular the pressure prevailing in the environment surrounding the breather device, so-called ambient pressure, acts on the venting valve body from one side and a pressure applied to the venting connection acts on the venting valve body from another, in particular opposite, side.

It is further provided that, in addition to the breather device, a ventilation element is provided, which can be physically separate from this venting device. Furthermore, a fluid-conducting connection, in particular from the environment surrounding the breather device into a housing chamber, in particular into a housing chamber which is connected in a fluid-conducting manner to the venting connection and at least can be connected to this venting connection, can be established by means of a ventilation element of this kind. In particular, an inflow of medium via the ventilation element can be provided with a combination of this kind, the ventilation element preferably having a non-return valve which prevents flow in the opposite direction, and a filter device can further preferably be provided, in particular in this ventilation element, the filter device preventing or preferably at least reducing passage of moisture or particles from the surrounding area into this housing chamber. A filter device of this kind is particularly preferably based on a specific standard, in particular what is known as the IPX7 standard, reference being made in particular to ISO standard 20653:2013 and the like in this connection for road vehicles.

A breather system comprising a breather device according to one of the embodiments explained above is also proposed, the breather system having a ventilation device comprising a ventilation connection in addition to the breather device. In particular, this ventilation connection can be connected in a fluid-conducting manner to a housing interior and in particular a housing interior of this kind is to be understood to mean a transmission chamber, this in particular being the same transmission chamber as in the case of the breather device. Furthermore, the ventilation device has a ventilation surroundings connection, which is connected in a fluid-conducting manner to an environment surrounding the ventilation device. The ventilation device can further preferably be understood to be at least substantially similar to the breather device, wherein one difference from this is that the ventilation device has a venting valve which in functional terms is preferably designed as a non-return valve, wherein a direction of flow from the ventilation surroundings connection to the venting connection through the ventilation valve can be temporarily or selectively opened by way of the non-return valve, so that these connections are connected to each other in a fluid-conducting manner and the direction of flow from the ventilation connection to the ventilation surroundings connection is further preferably blocked in particular owing to the non-return functionality of the ventilation valve. In other words, this ventilation valve has a ventilation valve body by means of which a fluid-conducting connection between the ventilation connection and the ventilation surroundings connection can be selectively interrupted.

Furthermore, the ventilation valve has a ventilation preloading device comprising a ventilation preloading element, wherein the ventilation preloading element is arranged movably in a ventilation pressure chamber and separates the ventilation pressure chamber into a first ventilation sub-chamber and a second ventilation sub-chamber. The ventilation preloading element is further preferably movable in the ventilation pressure chamber in such a way that a ventilation preloading force on the ventilation valve body can be indirectly or directly changed by way of this ventilation preloading element. Owing to the changing ventilation preloading force, it is in particular possible for the opening time or the opening characteristic, starting from which the fluid-conducting connection from the ventilation surroundings connection to the ventilation connection is opened by the ventilation valve to be changed, wherein the pressure difference is given fundamentally by a pressure applied to the ventilation surroundings connection and a pressure applied to the ventilation connection. The pressure acting on the ventilation surroundings connection acts on one side of the ventilation valve body and the pressure on the ventilation connection acts on the opposite side of the ventilation valve body.

In particular for changing the ventilation preloading force, the first ventilation sub-chamber can be connected in a fluid-conducting manner via a first ventilation preloading connection to a housing interior, in particular the transmission chamber, and the second ventilation sub-chamber can further preferably be connected in a fluid-conducting manner by way of the second ventilation preloading connection to a further housing interior, in particular the electric machine chamber. In particular, it is possible with the two preloading connections (first/second ventilation preloading connection) to influence the ventilation preloading force which can be changed by means of the ventilation preloading element. In particular, targeted ventilation and venting from two housing chambers and into an environment surrounding the breather system is possible by means of a breather system of this kind and thus an improved breather system can be provided.

In a preferred embodiment of the breather system, a ventilation direction is defined by the ventilation device, the ventilation direction being directed from the ventilation surroundings connection toward the ventilation connection and in particular through this ventilation valve, or is determined by an air flow in this direction. An air flow of this kind from the environment surrounding the breather system in the ventilation direction, via the ventilation valve, toward the ventilation connection would further preferably result in the case of medium, in particular ambient air, being fed from the surrounding area to the housing chamber connected in a fluid-conducting manner in the ventilation chamber. In a preferred embodiment of the invention, the ventilation device has a ventilation membrane through which an air flow of this kind at least partially or completely passes during this flow. A configuration of this kind with a ventilation membrane preferably makes it possible for this ventilation membrane to prevent particles of dirt or moisture or both from entering the ventilation connection and thus in particular from entering a housing chamber connected to this ventilation connection and the breather system is therefore further preferably able to meet specific classes of protection, such as IPX7 in particular, in particular according to ISO 20653:2013 for road vehicles. In particular, an improved breather system, in particular with improved operational reliability, can be provided owing to a ventilation membrane of this type.

In a preferred embodiment of the breather system, the ventilation membrane is arranged upstream of the ventilation valve, with respect to the ventilation direction, so that such ingress of contaminants (particles of dirt, moisture) into the ventilation valve can be prevented or at least reduced. In particular, the functional reliability of the ventilation device can be improved with such an arrangement of the ventilation membrane. The ventilation membrane is further preferably arranged in the ventilation surroundings connection, in particular ingress of contaminants into the ventilation device can largely be prevented or at least reduced with an arrangement of this kind.

In a further preferred embodiment of the invention, at least the ventilation valve and the venting valve are arranged in a common system housing. This system housing further preferably contains a plastic as a constituent part or consists of such a plastic. At least one connecting line for connecting at least two connections of this breather system in a fluid-conducting manner is further preferably designed as a recess in this system housing, preferably a recess of this kind is designed as a channel line. A particularly compact design of the breather system is rendered possible in particular by means of integration into a common system housing.

An electric drive unit comprising an electric drive machine which has an electric machine chamber, in which live components are arranged, and which has a traction transmission, which can be mechanically driven by means of a drive shaft of this electric drive machine, and which has a transmission chamber, in which a liquid medium, in particular a liquid transmission lubricant, is at least temporarily accommodated is further proposed. In the case of an electric drive unit of this kind, the problem faced is, in principle, passage of this drive shaft out of the electric machine chamber into the transmission chamber with an, in particular contact-making, seal in order to prevent a liquid medium from passing or at least make it difficult for a liquid medium to pass from the transmission chamber into the electric machine chamber during operation of the electric drive unit. A "driver" for passing liquid medium from the transmission chamber into the electric machine chamber may be a pressure gradient between these two chambers, that is to say in particular a positive pressure in the transmission chamber in relation to the electric machine chamber. In particular, a pressure gradient of this kind between the two chambers under consideration can be reduced by equalizing the pressures in these two relevant housing interiors with respect to each other. This reduction in a pressure gradient can be performed both by reducing the pressure in the chamber in which a negative pressure prevails and also by increasing the pressure in the chamber in which a negative pressure prevails, so that, at least substantially, similar/identical pressures prevail in the two relevant housing interiors. In order to reduce or prevent an undesired pressure gradient of this kind, the invention proposes using at least the proposed venting device for ventilating or venting the transmission chamber or a breather system of the proposed design.

In the electric drive unit, the drive shaft passes from the electric machine chamber, through a housing separating wall, into the transmission chamber and a drive shaft seal is provided, which seals off the drive shaft from the housing separating wall, so that in particular passage of liquid medium from the transmission chamber into the electric machine chamber across this seal is prevented or at least reduced. Furthermore, a first alternative provides a breather device of the design described above, wherein the venting connection is connected in a fluid-conducting manner to the transmission chamber and wherein the first preloading sub-chamber is connected in a fluid-conducting manner to the transmission chamber via the first preloading connection, and wherein the second preloading sub-chamber is connected in a fluid-conducting manner to the electric machine chamber by way of the second preloading connection. A refinement of this kind is based on the knowledge that not only is the pressure difference between the transmission chamber and the environment surrounding the breather device used for venting the transmission chamber for reliable functioning of the electric drive machine but rather that the pressure in the electric machine chamber is also used by means of the valve preloading device for forming the preloading force and thus for influencing the opening characteristic of the breather device.

In a second alternative of the electric drive machine, the breather system of the design described above is proposed for ventilating and venting the electric drive machine, wherein here the ventilation connection is connected in a fluid-conducting manner to the transmission chamber, the venting connection is connected in a fluid-conducting manner to the transmission chamber, the first preloading sub-chamber is connected in a fluid-conducting manner to the transmission chamber via the first preloading connection, the second preloading sub-chamber is connected in a fluid-conducting manner to the electric machine chamber by way of the second preloading connection and the first ventilation sub-chamber is further connected in a fluid-conducting manner to the transmission chamber via the first ventilation preloading connection and the second venting sub-chamber is connected in a fluid-conducting manner to the electric machine chamber by way of the second ventilation preloading connection. In particular, firstly venting or ventilation of the electric drive unit can be achieved with a refinement of this kind, in which firstly passage of media from the transmission chamber into the electric machine chamber is prevented and secondly a simple seal for sealing off the drive shaft during passage can be inserted between these two chambers, so that an improved electric drive unit can be provided, preferably an electric drive unit with high efficiency and operational reliability.

Individual features and embodiments are presented below on the basis of the at least partially diagrammatic figures, combinations of features other than those presented also being possible here in principle to form further embodiments.

DETAILED DESCRIPTION OF THE DRAWINGS

Figure 1:
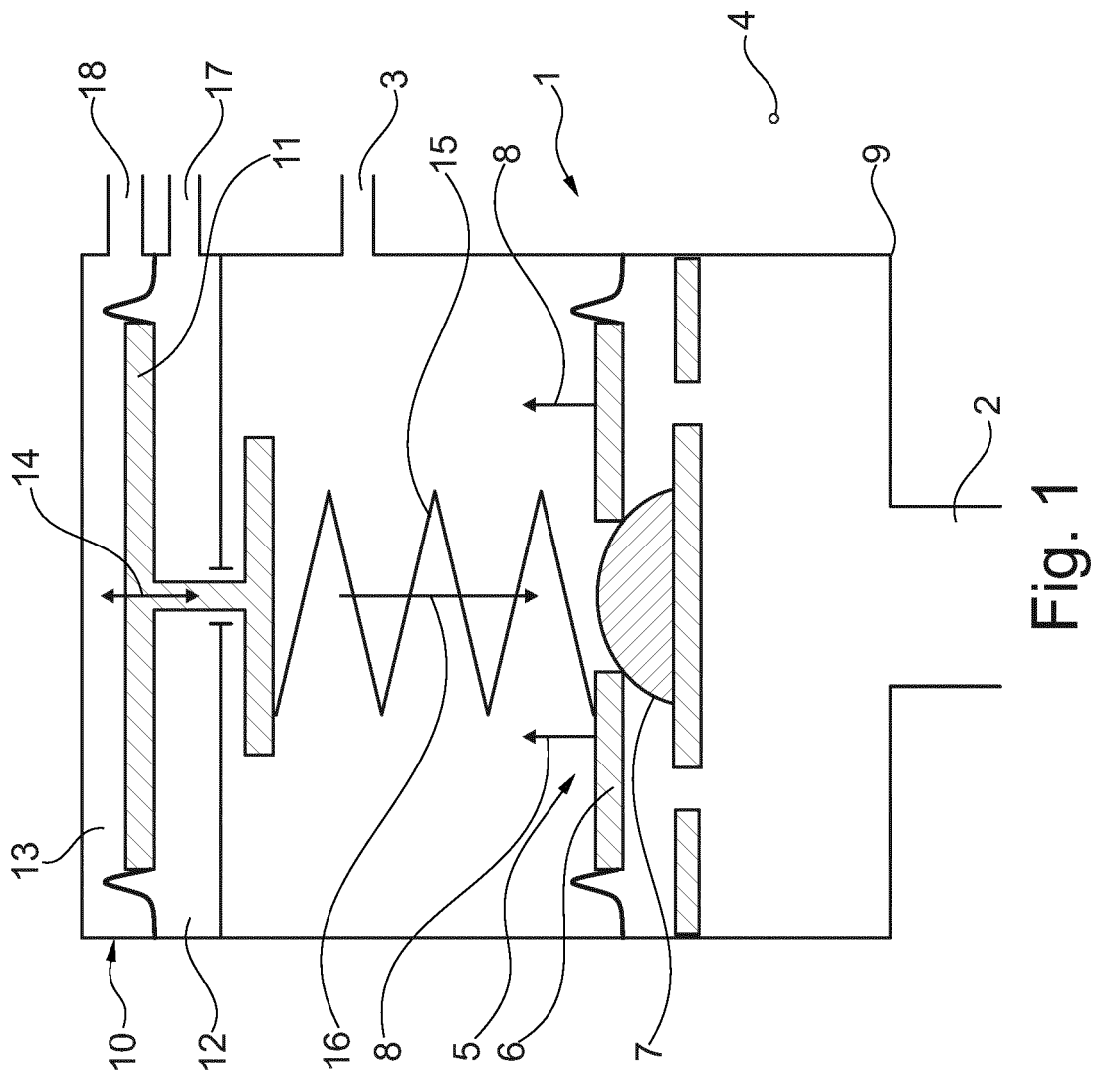
FIG. 1 is a schematic sectional illustration of a breather device.

FIG. 1 shows a sectional illustration of a breather device with pressure-equalization function. The breather device 1 with pressure-equalization function allows pressure equalization between an electric machine chamber and a transmission chamber. In order to make this pressure equalization possible, or to prevent undesired pressure differences between these two chambers, the breather device 1 has a venting connection 2, which can be connected in a fluid-conducting manner to the transmission chamber, so that the pressure prevailing in the transmission chamber can be applied in this venting connection 2. The breather device 1 further has a surroundings connection 3 which is connected in a fluid-conducting manner to an environment 4 surrounding the breather device 1. The breather device further has a venting valve 5 by way of which a fluid-conducting connection between the venting connection 2 and the surroundings connection 3 can be selectively interrupted by means of a venting valve body 6, by which a closed state of the venting valve or an open state of the venting valve 5 is established.

In the form illustrated in FIG. 1, the fluid-conducting connection between the surroundings connection 3 and the venting connection 2 is interrupted. In this interrupted state, the venting valve body 6 is seated on a venting valve seat 7. The venting valve body 6 is accommodated movably in the venting valve housing 9 and can lift off from the venting valve seat 7 in the opening direction 8 and thus establish the fluid-conducting connection from the venting connection 2 to the surroundings connection 3.

The breather device 1 further has a valve preloading device 10. The valve preloading device 10 has a valve preloading element 11, wherein the valve preloading element 11 is arranged movably in the preloading movement direction 14 in a preloading pressure chamber and separates the preloading pressure chamber into a first preloading sub-chamber 12 and a second preloading sub-chamber 13. In the illustrated embodiment of the breather device 1, a preloading force 16 on the venting valve body 6 can be directly changed by the valve preloading element 11 via a preloading spring device 15. A basic idea of the invention is that the preloading, which pushes the venting valve 5 into its closed position, can be changed via the valve preloading device, and for this purpose two pressures from housing interiors are impressed on the valve preloading device, which pressures should be in a specific ratio to one another, preferably should be equal. The venting valve 5 accordingly acts as a controllable non-return valve, wherein the blocking action is selected in accordance with the desired functionality of ventilation or venting.

This change in the preloading force is caused by way of the preloading spring device 15 being loaded in the case of a reduction in the size of first preloading sub-chamber 12 and thus a simultaneous increase in the size of the second preloading sub-chamber 13, and thus the preloading force 16 is increased, whereas the preloading spring device 15 is relieved of loading in the case of a reduction in the size in the second preloading sub-chamber 13 and thus a simultaneous increase in the size of the first preloading sub-chamber 12, and thus the preloading force 16 is reduced.

In functional terms, a pressure difference between the pressure prevailing in the venting connection and the pressure prevailing in the surroundings connection prevails at a relatively large preloading force 16 in comparison to a comparatively smaller preloading force, which pressure difference is sufficient to lift the venting valve body 6 off from the venting valve seat 7 in the direction 8 and thus to establish the fluid-conducting connection between the venting connection 2 and the surroundings connection 3. Thus, if the preloading force is reduced by the valve preloading device 10, the venting valve 5 opens at smaller pressure differences than at a comparatively higher preloading force.

The first preloading sub-chamber 12 can further be connected in a fluid-conducting manner to the transmission chamber via a first preloading connection 17 and the second preloading sub-chamber 13 can further be connected in a fluid-conducting manner to the electric machine chamber by way of the second preloading connection 18. By way of the breather device configured in this way, it is accordingly possible to make venting via the venting connection 2 into the surrounding connection 3 not only dependent on the pressure difference in these two connections but rather to make the opening characteristic of the venting valve 5 additionally dependent on the preloading force adjustable by means of the valve preloading device and thus to achieve an improved venting functionality. Furthermore, the opening characteristic can also be influenced by friction, in particular by seals, in the breather device, or in the breather system. Structural influencing of this opening characteristic is further rendered possible by means of the area ratios on the valve preloading element in the preloading device 10.

Figure 2:
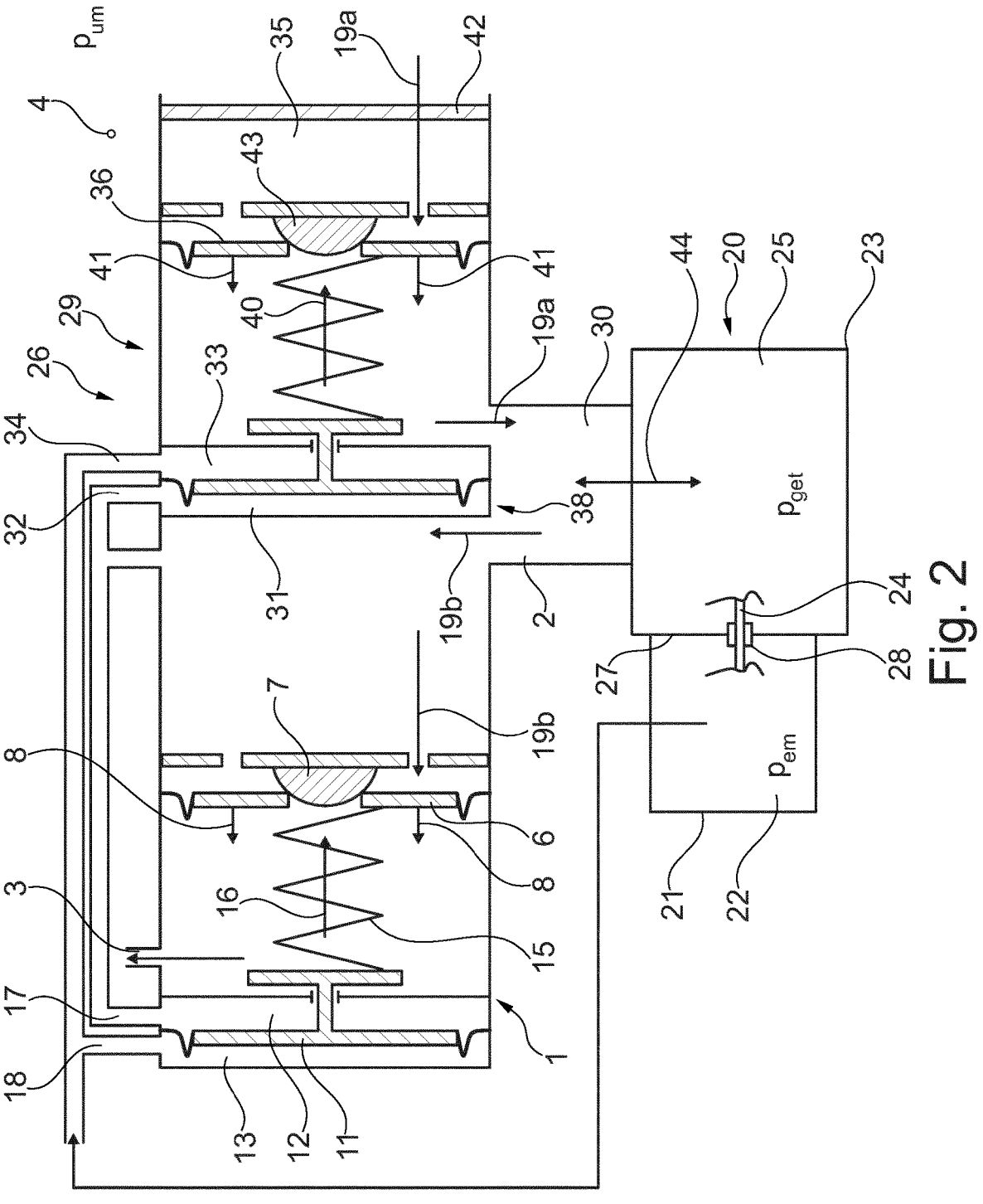
FIG. 2 is a schematic sectional illustration of a breather system with connection to an electric drive unit.

FIG. 2 shows a sectional illustration of an electric drive unit 20 comprising an electric drive machine 21, which has an electric machine chamber 22, and comprising a traction transmission 23, which can be mechanically driven by means of a drive shaft 24 of this electric drive machine 21 and which has a transmission chamber 25. Here, the breather system 26 illustrated in section is illustrated on a much larger scale than the electric drive unit 21. The ambient pressure $p_{um}$ prevails in the environment 4 surrounding the breather system, the transmission pressure $p_{get}$ prevails in the transmission chamber 25 and the electric machine pressure $p_{em}$ prevails in the electric machine chamber 22. At a relatively high transmission pressure $p_{get}$ as the electric machine pressure $p_{em}$, transmission lubricant is pushed out of the transmission chamber 25 in the direction of the electric machine chamber 22, and it is therefore an object of the invention firstly to prevent ingress of moisture and particles into the transmission chamber 25 and secondly to prevent a large pressure gradient from the transmission chamber 25 to the electric machine chamber 22.

The drive shaft 24 is guided through a housing separating wall 27 and thus passes from the electric machine chamber 22 into the transmission chamber 25 in order to transmit a mechanical drive power between the electric drive machine 21 and the traction transmission 23 during planned operation. A drive shaft seal 28 is also provided, the drive shaft seal sealing off the drive shaft 24 from the housing separating wall 27.

Instead of the illustrated breather system comprising a breather device and a ventilation device, only one breather device of the above-described design can also be provided as an alternative. In addition, in the case of an embodiment, not illustrated, of this kind (only breather device), a ventilation device can still be provided, this ventilation device allowing air flow from the surrounding area into the traction transmission. The breather device can further preferably be used in an embodiment, likewise not illustrated, of the invention to ventilate a housing interior if the breather device is configured in such a way that the venting connection 2 is connected to the environment 4 surrounding the breather device and the surroundings connection 3 is connected to the housing chamber to be ventilated/vented, in particular to the transmission chamber 25, in accordance with one of the embodiments described above. In the case of an embodiment of this kind, for ventilation, the first preloading connection is preferably connected in a fluid-conducting manner to the electric machine chamber and the second preloading connection is connected to the transmission chamber, so that as pressure increases in the electric machine chamber and there is a constant or falling pressure in the transmission chamber the preloading force on the venting valve body is reduced and opening of the breather valve is thus made easier.

In the breather system illustrated in FIG. 2, the ventilation connection 30 is connected in a fluid-conducting manner to the transmission chamber, and in the process the ventilation connection 30 coincides with the venting connection 2 of the breather device 1, see venting connection 2 in FIG. 1. This venting connection and this ventilation connection can further be physically separate from each other. Reference is made substantially to the ventilation device 29 below. With the breather system illustrated, a media flow 44 into and out of the transmission chamber 25, preferably an air flow into and out of the transmission chamber, is rendered possible via the breather system 26.

The breather system 26 further has the first preloading sub-chamber 12, which is connected in a fluid-conducting manner to the transmission chamber 25 via the first preloading connection 17. The second preloading sub-chamber 13 is further connected in a fluid-conducting manner to the electric machine chamber 22 by way of the second preloading connection 18. The ventilation connection 30, which coincides with the venting connection in this embodiment, is connected in a fluid-conducting manner to the transmission chamber 25. The first ventilation sub-chamber 31 is connected in a fluid-conducting manner to the transmission chamber 25 via the first ventilation preloading connection 32. The second ventilation partial chamber 33 is further connected in a fluid-conducting manner to the electric machine chamber 22 by way of the second ventilation preloading connection 34.

Air flow out of the environment 4 surrounding the breather system can take place through the ventilation membrane 42 when the ventilation valve 37 is open, that is to say when the ventilation valve body 36 is lifted off from the ventilation valve seat 43, that is to say when the ventilation valve body is moved in the ventilation valve opening direction 41 against the ventilation preloading force 40. The ventilation preloading force 40 can be changed via the ventilation preloading element 39 and its ability to move. The ventilation membrane is designed as a membrane that is impermeable to moisture and permeable to air in the direction of an air flow from the ventilation surroundings connection 35 toward the ventilation connection 30.

In other words, one problem of the invention can be considered that of achieving a pressure level between the electric machine chamber and the transmission chamber that is equalized as far as possible, wherein no direct media transfer (air/oil) between the transmission chamber and the electric machine chamber has to take place in so doing.

In the case of non-stationary operation of an electric drive unit, different pressure levels between the electric machine chamber and the transmission chamber can occur at specific operating points, wherein the drive shaft extends out of the electric machine chamber into the transmission chamber, and wherein the drive shaft is sealed off by means of the drive shaft seal, wherein, to implement the sealing-off concept between these two chambers, in particular at the lead-through of the drive shaft, a pressure gradient that is as small as possible is advantageous. In the case of switchable valves which are required in particular for achieving specific sealing requirements, such as what is known as IPX7 standard in particular, there are switching thresholds which cannot be designed to be as low as desired. In addition, there are pressure fluctuations which influence this pressure, and furthermore a pressure-equalization membrane can lead to a pressure difference, in particular during non-stationary operation.

The proposed concept proposes a venting valve for solving the problem, the opening pressure of the venting valve being reduced by pressure delta between the electric machine chamber and the transmission chamber. The combination of the 2 valves for feed air and discharge air, that is to say for ventilation and venting, is further proposed as a breather system. In this case, a membrane which satisfies IPX7 requirements is preferably optionally provided for the feed air side. For a breather system of this kind, the two connections of the venting valves can be connected hose systems/pipe systems for equalizing the pressures prevailing in the electric machine chamber or in the transmission chamber, an integration solution is further also proposed, in which the two valves of the venting system are combined in an overall module, as is illustrated in FIG. 2.

LIST OF REFERENCE SIGNS

| | |
|---|---|
| 1 | Breather device |
| 2 | Venting connection |
| 3 | Surroundings connection |
| 4 | Surrounding environment |
| 5 | Venting valve |
| 6 | Venting valve body |
| 7 | Venting valve seat |
| 8 | Opening direction |
| 9 | Venting valve housing |
| 10 | Valve preloading device |
| 11 | Valve preloading element |
| 12 | First preloading sub-chamber |
| 13 | Second preloading sub-chamber |
| 14 | Preloading movement direction |
| 15 | Preloading spring device |
| 16 | Preloading force |
| 17 | First preloading connection |
| 18 | Second preloading connection |
| 19a | Ventilation direction |
| 19b | Venting direction |
| 20 | Electric drive unit |
| 21 | Electric drive machine |
| 22 | Electric machine chamber |
| 23 | Traction transmission |
| 24 | Traction transmission |
| 25 | Transmission chamber |
| 26 | Breather system |
| 27 | Housing separating wall |
| 28 | Drive shaft seal |
| 29 | Ventilation device |
| 30 | Ventilation connection |
| 31 | First ventilation sub-chamber |
| 32 | First ventilation preloading connection |
| 33 | Second ventilation sub-chamber |
| 34 | Second ventilation preloading connection |
| 35 | Ventilation surroundings connection |
| 36 | Ventilation valve body |
| 37 | Ventilation valve |
| 38 | Ventilation preloading device |
| 39 | Ventilation preloading element |
| 40 | Ventilation preloading force |
| 41 | Ventilation valve opening direction |
| 42 | Ventilation membrane |
| 43 | Ventilation valve seat |
| 44 | Media flow |

What is claimed is:

1. A breather device with a pressure-equalization function between an electric machine chamber and a transmission chamber, comprising:
a venting connection and a surroundings connection, wherein one of said venting and surroundings connections is connected in a fluid-conducting manner to an environment surrounding the breather device, and the respectively other connection is connectable in a fluid-conducting manner to the transmission chamber; and a venting valve having a venting valve body, wherein a fluid-conducting connection between the venting connection and the surroundings connection is selectively interruptible via of the venting valve body, wherein the venting valve has a valve preloading device comprising a valve preloading element, the valve preloading element separates a preloading pressure chamber into a first preloading sub-chamber and a second preloading sub-chamber, and a preloading force on the venting valve body is indirectly or directly changeable by way of the valve preloading element, and the first preloading sub-chamber is connectable in a fluid-conducting manner via a first preloading connection to the transmission chamber or to the electric machine chamber, and the second preloading sub-chamber is connectable in a fluid-conducting manner by way of a second preloading connection to the respectively other one of said transmission chamber or electric machine chamber.

2. The breather device according to claim 1, wherein the venting connection is connectable in a fluid-conducting manner to the transmission chamber and the surroundings connection is connected in a fluid-conducting manner to the environment surrounding the breather device, and the first preloading connection is likewise connectable in a fluid-conducting manner to the same chamber as the venting connection.

3. The breather device according to claim 1, wherein the surroundings connection is connectable in a fluid-conducting manner to the transmission chamber and the venting connection is connected in a fluid-conducting manner to the environment surrounding the breather device, and the second preloading connection is likewise connectable in a fluid-conducting manner to the same chamber as the venting connection.

4. The breather device according to claim 1, wherein the valve preloading element applies the preloading force to the venting valve body via a spring device.

5. The breather device according to claim 1, wherein the valve preloading element indirectly or directly applies the preloading force to the venting valve body such that the venting valve body is preloaded into a closure position in which the fluid-conducting connection between the venting connection and the surroundings connection is interrupted.

6. A breather system, comprising:

a breather device according to claim 1;

a ventilation device comprising a ventilation connection, which is connectable in a fluid-conducting manner to the transmission chamber, and comprising a ventilation surroundings connection, which is connected in a fluid-conducting manner to the environment surrounding the breather device, and comprising a ventilation valve, by way of which a fluid-conducting connection between the ventilation connection and the ventilation surroundings connection is selectively interruptible via a ventilation valve body, wherein the ventilation valve has a ventilation preloading device comprising a ventilation preloading element, the ventilation preloading element separates a ventilation pressure chamber into a first ventilation sub-chamber and a second ventilation sub-chamber, and a ventilation preloading force on the ventilation valve body is indirectly or directly changeable by way of the ventilation preloading element, and the first ventilation sub-chamber is connectable in a fluid-conducting manner to the transmission chamber via a first ventilation preloading connection, and the second ventilation sub-chamber is connectable in a fluid-conducting manner to the electric machine chamber by way of the second ventilation preloading connection.

7. The breather system according to claim 6, wherein an air flow passes through a ventilation membrane in a ventilation direction from the environment surrounding the breather system, via the ventilation valve, toward the ventilation connection.

8. The breather system according to claim 7, wherein the ventilation membrane is arranged upstream of the ventilation valve with a ventilation valve seat with respect to the ventilation direction.

9. The breather system according to claim 2, wherein the ventilation valve of the ventilation device and the venting valve of the breather device are arranged in a common system housing.

10. An electric drive unit, comprising:

a breather device according to claim 1;

an electric drive machine having an electric machine chamber; and a traction transmission, which is mechanically driven by a drive shaft of said electric drive machine and which has a transmission chamber, wherein the drive shaft enters the transmission chamber from the electric machine chamber through a housing separating wall, and wherein a drive shaft seal is provided, which seals off the drive shaft from the housing separating wall;

wherein the venting connection is connected in a fluid-conducting manner to the transmission chamber, and wherein the first preloading sub-chamber is connected in a fluid-conducting manner to the transmission chamber via the first preloading connection, and wherein the second preloading sub-chamber is connected in a fluid-conducting manner to the electric machine chamber by way of the second preloading connection.

11. An electric drive unit, comprising:

a breather system according to claim 6;

an electric drive machine having an electric machine chamber; and a traction transmission, which is mechanically driven by a drive shaft of said electric drive machine and which has a transmission chamber, wherein the drive shaft enters the transmission chamber from the electric machine chamber through a housing separating wall, and wherein a drive shaft seal is provided, which seals off the drive shaft from the housing separating wall; and wherein the ventilation connection is connected in a fluid-conducting manner to the transmission chamber, and wherein the venting connection is connected in a fluid-conducting manner to the transmission chamber, and wherein the first preloading sub-chamber is connected in a fluid-conducting manner to the transmission chamber via the first preloading connection, and wherein the second preloading sub-chamber is connected in a fluid-conducting manner to the electric machine chamber by way of the second preloading connection, and wherein the first ventilation sub-chamber is connected in a fluid-conducting manner to the transmission chamber via the first ventilation preloading connection, and wherein the second ventilation sub-chamber is connected in a fluid-conducting manner to the electric machine chamber by way of the second ventilation preloading connection.

\*  \*  \*  \*  \*